US006872754B1

(12) United States Patent
Wortham

(10) Patent No.: US 6,872,754 B1
(45) Date of Patent: Mar. 29, 2005

(54) METHOD FOR PROCESSING ELASTOMERS

(76) Inventor: Leon Wortham, 5721 Vincent Rd., Chattanooga, TN (US) 37416

( * ) Notice: Subject to any disclaimer, the term of this patent is extended or adjusted under 35 U.S.C. 154(b) by 153 days.

(21) Appl. No.: 10/096,300

(22) Filed: Mar. 11, 2002

Related U.S. Application Data

(63) Continuation-in-part of application No. 09/469,203, filed on Dec. 21, 1999.

(51) Int. Cl.[7] .............................................. C08J 11/04
(52) U.S. Cl. ....................................... 521/41; 521/40.5
(58) Field of Search .......................... 521/40, 40.5, 41, 521/44, 45.5

(56) References Cited

U.S. PATENT DOCUMENTS

| | | | |
|---|---|---|---|
| 4,025,990 A | 5/1977 | Lovett, Jr, | 241/14 |
| 5,127,588 A | 7/1992 | Schmidt | 241/97 |
| 5,362,759 A | 11/1994 | Hunt et al. | 521/44.5 |
| 5,556,888 A | 9/1996 | Koda et al. | 521/44.5 |
| 5,611,492 A * | 3/1997 | Hunt et al. | 241/23 |
| 5,770,633 A | 6/1998 | Naraki et al. | 521/43 |
| 5,905,095 A | 5/1999 | Adkins | 521/43.5 |
| 6,333,373 B1 * | 12/2001 | Rouse et al. | 524/113 |

* cited by examiner

Primary Examiner—Katarzyna Wyrozebski
(74) Attorney, Agent, or Firm—Miller & Martin PLLC

(57) ABSTRACT

This invention utilizes two solvents, DMSO and d-limonene, to aid in the processing of cured rubber or hydrocarbon elastomers into crumb, without altering the physical properties of the elastomer. After the rubber has been sufficiently softened it is ground and the elastomers are washed and separated from any other components.

17 Claims, 4 Drawing Sheets natural rubber

METHOD FOR PROCESSING ELASTOMERS

This application is a continuation in part of U.S. Ser. No. 09/469,203 filed Dec. 21, 1999.

FIELD OF THE INVENTION

This invention relates to the process of reclaiming elastomeric waste material, particularly vulcanized rubber from used tires, to produce usable raw material. The invention relates to an improved process which enhances the solubilization of rubber without the use of heat, pressure or cryogenic methods.

BACKGROUND OF THE INVENTION

Over 265 million used tires are discarded each year in the United States. Some of these tires are recycled. Most, however, end up as litter that clutters landfills. The disposal of used tires poses a serious health and environmental threat. Used tires are not biodegradable and thus are placed in landfills and stockpiles, where they provide insect breeding grounds and are potential fire hazards. The tires are also difficult to store in landfills because they tend to work their way to the top of the fill causing damage to the cap or seal of the landfill. The cost associated with discarding tires in sanctioned dump sites results in a large number of tires being dumped illegally. The problems associated with discarding used tires have been the driving force behind finding methods to recycle used tires.

Another consideration contributing to the need for the development of a reclaiming process for tires has been to recover the components used in tire manufacturing. Crumb rubber reclaimed from recycled rubber can be used as an additive to asphalt and other paving compositions, and on playing fields, in addition to being used in other manufacturing processes such as manufacturing new tires. Metal products reclaimed from recycled tires can be used in making low grade steel products such as hangers and other wire products.

These factors have led to increased demands for efficient and cost effective methods of tire recycling. A variety of techniques have been employed to process elastomers into crumb, particularly with vulcanized rubber. Heat, cryogenic, and pressurized processes are often used with some degree of success. Solvents such as acetone, gasoline and other petroleum products have been used to soften the rubber but have altered the physical properties of the elastomer. Magnets have been used in elaborate processes to extract steel from the steel belts of the used tires.

Breaking up tires into small tire chips represents the first step in the process of reclaiming materials from used tires. Schmidt, U.S. Pat. No. 5,127,588 discloses an apparatus that uses cutting blades to reduce vehicle tires into small chip-like particles.

Adkins, U.S. Pat. No. 5,905,095 discloses an approach of processing used tires by submerging shredded tires in a bath containing a combination of isocyanide, polyurethane, latex and soybean oil and heating the resultant mixture at approximately 700° F.

Lovett, Jr., U.S. Pat. No. 4,025,990 discloses a process for reclaiming rubber from whole or shredded tires by cooling scrap tires in a cryogenic freezer to the embrittlement temperature, followed by magnetic separation and further cryogenic reduction.

Another approach is shown in Hunt U.S. Pat. No. 5,362,759, which uses d-limonene, reduced pressurization and heat generated by microwave. Hunt's approach is not economically attractive on an industrial scale because the process takes over 24 hours of processing before the tire pieces are ready to grind into crumb. It also fails to even partially de-vulcanize the rubber elastomer. Hunt's approach is active and time consuming which increases the production costs of the reclaimed rubber.

Using d-limonene alone, without heat or pressurization, to soften the elastomer takes approximately 24 hours. Acetone has been used in the past in conjunction with d-limonene to speed up the process. However, acetone causes the rubber elastomers to lose its physical properties, and increases ash byproducts. All of the above-described processes are either time consuming, costly or ineffective, and therefore are of limited value.

An alternative simple process is offered that does not require heat, pressure or cryogenic methods, nor chemicals that alter the physical properties of the elastomer. This improved process passively solubilizes vulcanized rubber sufficiently to be ground into crumb in less than 4 hours. The invention uses two solvents to treat vulcanized rubber, dimethylsulfoxide (DMSO) and d-limonene. The DMSO increases the permeability of the rubber; thereby, increasing the surface area for oxidization of the elastomer by DMSO and d-limonene. As a result, processing time is reduced at least 50% at ambient temperature.

The present invention avoids the deficiencies of the prior art and provides a relatively fast, inexpensive, and effective method for recovering recyclable materials from used tires and other elastomeric materials. The present invention is directed at solubilizing the elastomer without heat, pressure, or cryogenic methods or the use of chemicals that alter the elastomer's physical properties. Other objects and advantages of the invention will appear from the following description.

SUMMARY OF THE INVENTION

The present invention recognizes and addresses the foregoing disadvantages, and others, of prior art construction and methods.

Accordingly, it is an object of the present invention to provide a novel and improved method of processing elastomeric polymers, particularly vulcanized rubber, into a recyclable form, crumb.

More particularly, it is an object of the present invention to facilitate the reclamation of rubber at ambient temperature without the necessity of employing heat, pressurization or cryogenic methods.

Another object of this invention is to reduce the processing time for reclaiming rubber.

Another object of this invention is to provide an improved rubber reclaiming solvent.

Another object of this invention is to provide an elastomeric reclaiming solvent which speeds up the reclaiming process without altering the physical characteristics of the elastomer.

Another object of this invention is to separate the metal and nylon impurities of the elastomer, without the need to use a magnetic separator.

Another object of this invention is to provide for a useful and high quality of recycled raw material.

Yet another object of this invention is to provide an improved and environmentally safe process for reclaiming elastomeric materials.

DETAILED DESCRIPTION OF THE PREFERRED EMBODIMENTS

Figure 1:
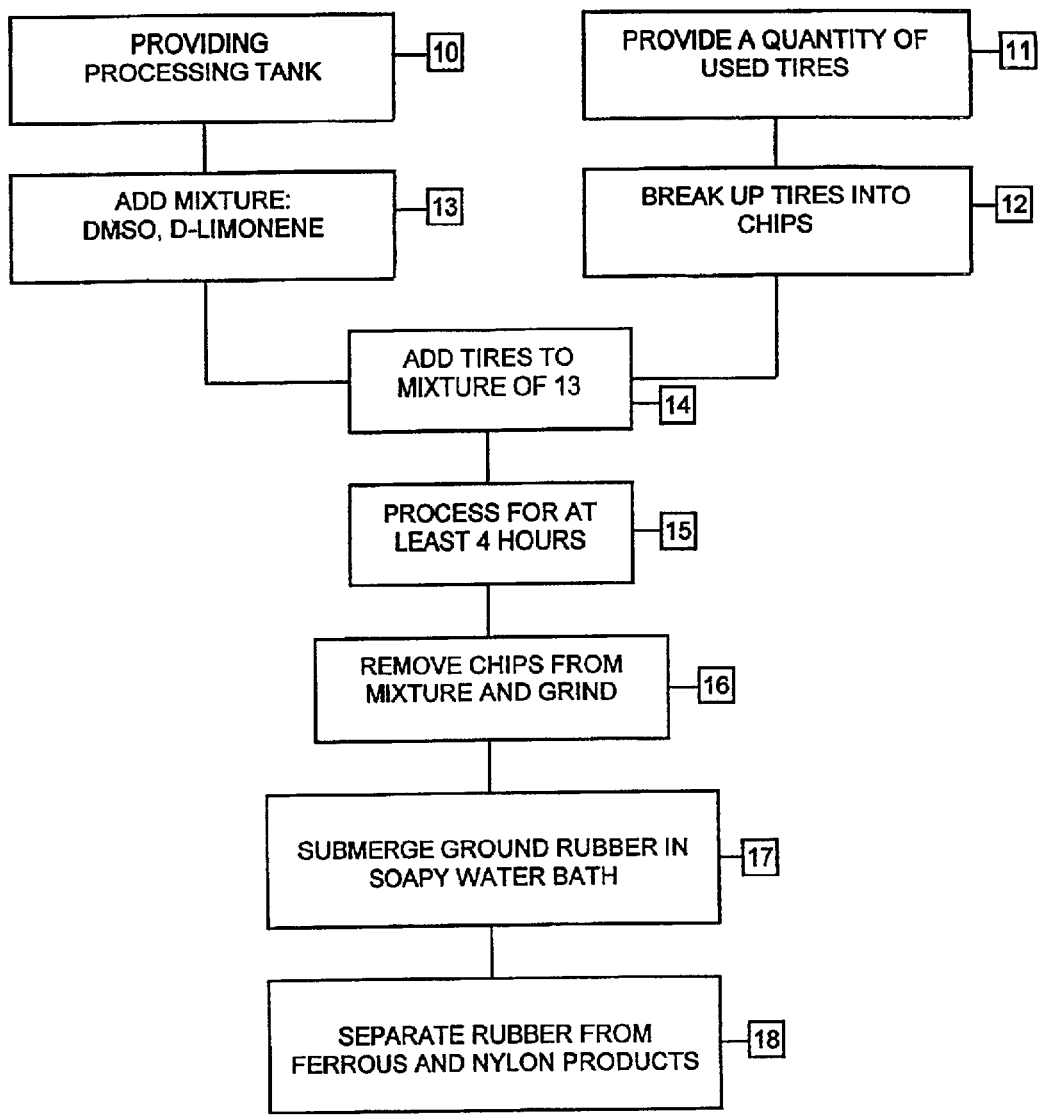
FIG. 1 is a diagram showing a preferred embodiment of the steps used in this invention for the reclamation of vulcanized rubber from used vehicular tires.

Reference will now be made in detail to the presently preferred embodiment of the invention. It will be apparent to those skilled in the art that modifications and variations can be made in the present invention without departing from the scope or spirit thereof. For instance when using scrap rubber from sources other than tires, the particular steps described for tires will be adapted to the alternative sources. Thus, it is intended that the present invention covers such modifications and variations as come within the scope of the appended claims and their equivalents.

The present invention discloses a method for breaking down waste tires and reclaiming the components thereof. The method begins with a quantity of used tires 11 which are processed into chips 12. The cutting up of the rubber into rubber chips can be achieved by any suitable means known in the art. The rubber is broken up into pieces typically of about 5×5×1 cm, although the particular size is not critical. In addition, the method requires a processing tank 10 which will contain DMSO and d-limonene 13.

After the rubber chips have been adequately cleaned to remove dirt and contaminates, they are placed in a tank 14 and soaked in a mixture 15 containing an effective amount of a polar aprotic solvent, preferably a sulfoxide or oxidizing agent, that does not change the physical properties of the elastomer, such as dimethylsulfoxide (DMSO) and an essential oil, such as d-limonene. The rubber chips are soaked for a period of time sufficient to reduce the tensile strength or Shore A hardness of the rubber so that it can be ground.

To reduce any reactivity of the solvents and rubber with the tank, the tank 10 is preferably made of glass. However, for durability and cost reasons the tank 10 can be any stainless steel or polypropylene container or any other chemical tank impervious to oil and oxidizing agents.

The tire chips are completely submerged in the bath containing a mixture of an effective amount of an appropriate polar aprotic solvent, which does not alter the physical properties of the elastomer, and an essential oil. The tire chips are soaked in the mixture at about 25° C. for a period of time sufficient to reduce the Shore A hardness of the rubber. In the preferred embodiment, the rubber chips are submerged in a mixture containing 30% DMSO and 70% d-limonene, by volume. After approximately 4 hours the tensile strength or Shore A hardness of the rubber chips is adequately reduced so that the chips can be put through a grinder 16 to produce crumb rubber. A Shore A hardness level below 35 is typically adequate for grinding vulcanized rubber, such as tire chips, into crumb. The length of time it takes to reach this level may vary depending on the type of elastomer used and the concentrations of the components of the mixture.

The following table shows the measure of Shore A hardness of tire chips after exposure to a mixture of DMSO and d-limonene, containing DMSO concentrations of 10%, 20%, and 30%, in timed intervals. Shore A hardness of the tire chips was determined with an ASTM device that measured hardness with a needle probe.

TABLE I

| | SHORE A HARDNESS (+2.0) | | |
| --- | --- | --- | --- |
| | | DMSO Concentration | |
| Time Interval | 10% | 20% | 30% |
| 2 hrs. | 59.5 | 57.5 | 39.0 |
| 4 hrs. | 57.0 | 52.0 | 25.5 |
| 6 hrs. | 53.5 | 44.5 | 20.0 |
| 8 hrs. | 49.0 | 36.0 | — |
| 10 hrs. | 43.5 | 27.5 | — |
| 12 hrs. | 38.0 | 21.5 | — |
| 16 hrs. | 27.5 | — | — |
| 20 hrs. | 21.0 | — | — |

The preferred mixture is a mixture of 30% DMSO and 70% d-limonene which yields a Shore A hardness level of below 35 in less than 4 hours. DMSO concentrations between about 15% and about 45% are generally effective although even pure DMSO can be employed. After reaching a Shore A hardness level below 35, the treated tire chips can be placed into a grinder 16, and ground to at least a 40 mesh cured rubber.

Once the desired degree of grinding has occurred, the ground rubber is soaked in a bath containing soapy water 17 to wash off the residual DMSO and d-limonene. Through gravity separation methods known in the art, ferrous and fiber fragments are separated from the ground rubber 18. The separation technique is achieved in the same step by soaking the ground rubber material in a soapy water bath. Ferrous particles, such as wires used in the steel belts of tires, synthetic fibers, such as nylons and other impurities, sink to the bottom of the bath. The ground rubber floats and can be scooped off the surface of the water bath. The resulting crude rubber material is allowed to air dry, tumble dry or is dried by any other method known in the art.

Another embodiment of this invention comprises submerging the tire chips in pure DMSO or any other polar aprotic solvent which does not change the physical properties of the elastomer. This embodiment also sufficiently reduces the Shore A hardness of the rubber so that it can be ground without the use of heat, pressure or cryogenic techniques. However, eliminating the essential oil from the mixture increases the length of time it takes to reduce the tensile strength or Shore A hardness of the rubber sufficiently so that it can be ground.

The combination of a sulfoxide solvent and d-limonene partly devulcanizes the elastomer which makes it easier to reduce to crumb rubber. Depending on the concentration of DMSO and d-limonene, and the particular elastomer, approximately 25%–50% of the elastomer is devulcanized. In the case of tire rubber the sulfur count is typically 25% less than untreated rubber after exposure to a 30% concentration of DMSO and 70% concentration of d-limonene. To some extent, the de-vulcanization process aids in reducing the hardness of the rubber so that it can be more easily ground to crumb.

A byproduct of the oxidation process which reduces vulcanized rubber into crumb is ash. Ash is a mixture of carbon and zinc. The ash content of the crumb rubber of the present invention is acceptable for almost all types of recycling although it may not be suited in some instances for reuse in the tire industry. However, ash may be removed from the crumb rubber by methods known in the art.

After the rubber has been reduced to crumb and the impurities have been separated, it can be further fully devulcanized. The reclaimed rubber produced by the process of this invention is useful as raw material in the manufacture of ceiling tiles, floor tiles, shingles, tires, tubes and other rubber industrial and consumer products.

Suitable conditions for the present invention may vary widely depending upon the type of elastomer being reclaimed. Rubber chips may be in the range of between 4 cm and 10 cm. Soaking times may be in the range of at least about 90 minutes to approximately 6 hours.

Figure 2:
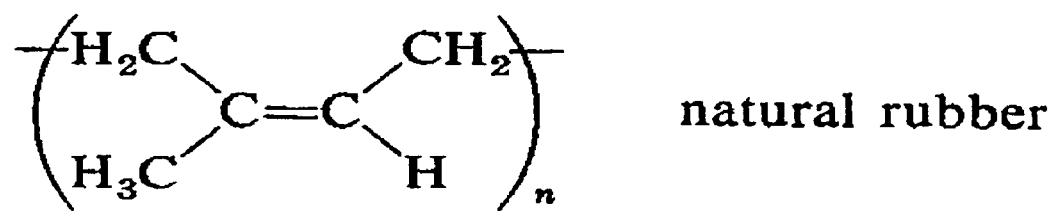
FIG. 2 is an illustration of a typical rubber molecule.

An explanation of the chemistry of the process is helpful to appreciating the invention. In most tires, natural rubber is utilized. The monomer in natural rubber is shown in FIG. 2.

Figure 3:
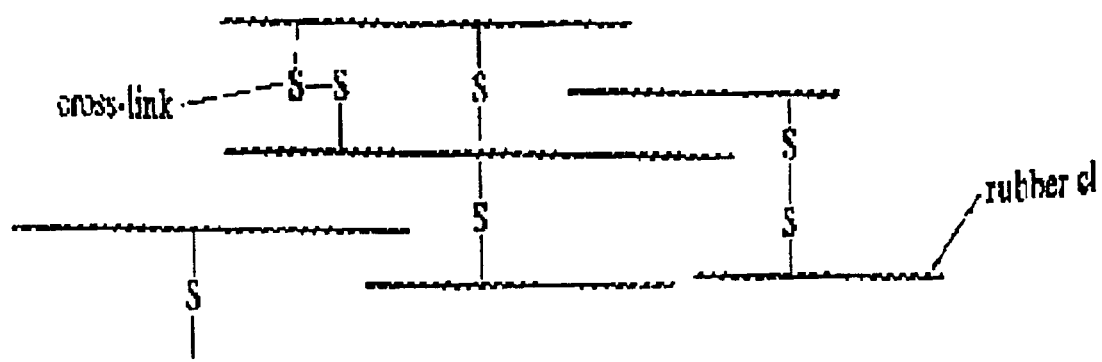
FIG. 3 is a representation of a group of vulcanized rubber molecules with sulfur bonds.

A rubber molecule is a polymer consisting of long chains of this monomer. When rubber is vulcanized, sulfur bonds the polymeric rubber molecules as shown in FIG. 3.

When d-limonene is applied to vulcanized rubber, has an affinity for clearing disulfide bonds, leading to the partial desulfurization and devulcanization of the tire material.

However, as the d-limonene remains in contact with the rubber molecules, also begins to breakdown the elastic polymer molecules resulting in a degradation of the elastomer's properties.

In tests of tire material process by the Hunt method described in U.S. Pat. No. 5,362,759, the hardness characteristics of the vulcanized rubber before processing was a Shore A measurement of 62. The processed and partially devulcanized and depolymerized rubber crumbs were of a permanently soft to gummy consistency having a greatly reduced hardness.

In tests of tire material processed by utilizing d-limonene and DMSO as described in the present application, the characteristics of the reclaimed rubber crumb appeared largely unchanged and returned to about the same Shore A hardness as before processing.

In short, limonene causes depolymerization and degradation of the elastomer characteristics while DMSO does not. By incorporating DMSO with d-limonene, the maximum surface area of the elastomer is rapidly exposed to the d-limonene, reducing processing times and ensuing depolymerization.

The following Table II shows that cured rubber elastomer from automobile tires is gradually softened (measured by Shore A hardness) by exposure to d-limonene. When the d-limonene is removed and the rubber dried, the rubber elastomer does not return to its previous hardness. On the other hand, DMSO softens the same cured elastomer to an equilibrium point within about 24 hours. When the DMSO is removed and the rubber allowed to dry for 24 hours, the rubber returns to its original hardness.

TABLE II

| | Shore A Hardness (+/−2.0) 20–25° C. | | | |
| --- | --- | --- | --- | --- |
| | d-Limonene | | DMSO | |
| Time | Indicated Time | 24 hours after removal | Indicated Time | 24 hours after removal |
| 0 | 62.5 | | 62.5 | |
| 24 hours | 58.2 | 58.4 | 39.3 | 62.3 |
| 48 hours | 49.7 | 49.6 | 38.9 | 62.6 |
| 72 hours | 37.4 | 37.5 | 39.1 | 62.4 |
| 96 hours | 21.4 | 21.4 | 39.0 | 62.7 |

TABLE II-continued

| | Shore A Hardness (+/−2.0) 20–25° C. | | | |
| --- | --- | --- | --- | --- |
| | d-Limonene | | DMSO | |
| Time | Indicated Time | 24 hours after removal | Indicated Time | 24 hours after removal |
| 120 hours | 13.8 | 13.9 | 38.9 | 62.0 |
| 14 days | 5.9 | 5.8 | 39.0 | 62.1 |

According to the process of the present invention with both d-limonene and DMSO, the Shore A hardness of the rubber decreases from about 62 to about 35 within a few hours and then after washing returns to a hardness of about 60.

Figure 4:
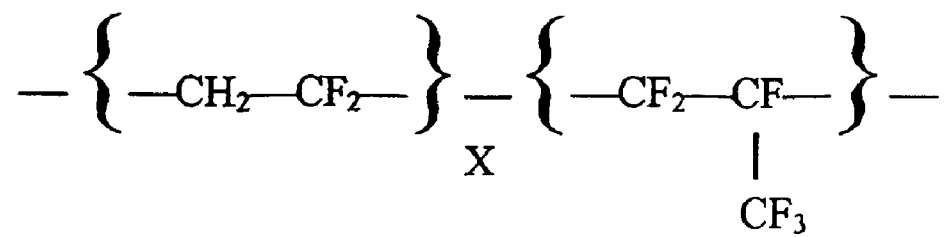
FIG. 4 is a representation of a typical fluorine rubber molecule.

The method of the present patent application also differs substantially from the Naraki process for regenerating cross-linked, vulcanized fluorine rubber, described in U.S. Pat. No. 5,770,633. A typical fluorine rubber molecule would be a vinylidene fluoride-hexafluoropropene copolymers comprised of the two monomers shown in FIG. 4.

The Naraki process adds cross-linked, cured fluorine rubber waste to a solvent such as DMSO and a strong acid such as fuming $H_2SO_4$ at a temperature of at least 50° C. In the ensuing reaction, the acid reacts with and breaks disulfide bonds. In addition, the acid breaks down the polymer chains, degrading the fluorine rubber's properties.

The data shown in Table I, and the Hunt reference's comments with respect to depolymerization, show that the Hunt process substantially changes the characteristics of the elastomer. The present invention substantially limits the time of contact of the d-limonene with the elastomer molecules and thereby minimizes depolymerization in an unexpected fashion. Similarly, the fluorine rubber molecules suffer substantial depolymerization during the exposure to acid.

While the process has been described in reference to the treatment of rubber (synthetic, natural or mixture thereof) it is contemplated that the process is equally applicable to other hydrocarbons including polyolefins and various classes of other plastics such as polyesters, polyamides (e.g., nylon) and other high molecular weight resins and polymers.

Depending upon the particular hydrocarbon, it will be suitable to use solvents of the class of polar aprotic solvents which include acetone, acetonitrile, dimethylformamide (DMF), dimethylsulfoxide (DMSO), and Hexamethylphosphoric triamide (HMPA) that do not degrade the physical properties of the hydrocarbon. In the use of rubber, for instance, acetone is not a desirable solvent because of such effects. It is more suitable to use sulfoxides or oxidizing agents within the class of polar aprotic solvents. These solvents include furaldehyde, furaldehyde diethyl acetal, furaldehyde dimethyldrazone, furan, trans-3-furanacrylic acid, 2-furanacrylonitrile, 2-furanboronic acid, 2(5H)-furanone, (2-furanylmethiene)malononitrile, furazolidone, furfuryl acetate, furfuryl alcohol, furfurylamine, furfuryl benzoate, furfuryl disulfide, furfuryl glycidyl ether, (furfurylideneacetyl) glycine, furfuryl mercaptan, furfuryl methacrylate, furfuryl methyl disulfide, 1-furfurylpyrrole, furfuryl sulfide, furfuryl thioacetate, furil, furoic acid, furoic hydrazide, furolin, 2-furonitrile, furosemide, 2-furoyl chloride, N-(2-furoyl)glycine, furylacrylic acid, and 4-(2—furyl)-3-buten-2-one. Some of the above mentioned solvents may not be appropriate for use in this process with particular elastomers because they may alter the physical properties of the elastomer.

It is suitable to use any essential oil containing limonene, linalool, mycrene or mixtures thereof. Examples of some essential oils which are suitable for the purpose of this invention include oils of orange, orange flowers, bitter orange, orange terpene, lemon lime, peppermint, spearmint, fir, fleabane, lavender, dill, celery and bergamot. It is most preferred to use pure d-limonene, linalool, mycrene or mixtures thereof.

It is most preferred to use a combination of pure d-limonene, linalool, mycrene or mixtures thereof with an effective amount of a sulfoxide from the class of polar aprotic solvents, which does not alter the physical properties of the elastomer, such as DMSO. It is most preferable to use a mixture of 30% DMSO and 70% d-limonene.

What is claimed is:

1. A process for reclaiming rubber elastomers from used tires comprising the steps of:
   (a) separating the used tires into rubber chips;
   (b) submerging the rubber chips in a mixture comprising between about 15–45% dimethylsulfoxide and at least 30% of an essential oil;
   (c) softening the pieces of used tire to a shore hardness level below about 35;
   (d) grinding the softened used tire pieces into rubber crumb of 40 mesh or finer,
   (e) soaking the rubber crumb in a bath comprising soap and water; and
   (f) removing floating rubber crumb from the top of the bath.

2. The process of claim 1 wherein the elastomer is submerged in the liquid for a period of less than 12 hours.

3. The process of claim 1 wherein the softening of the vulcanized rubber elastomer is effected at about ambient temperatures.

4. A process for reclaiming cured hydrocarbon elastomers from tires comprising submerging pieces of the vulcanized rubber elastomer in a liquid mixture comprising between about 15% to about 45% dimethylsulfoxide and at least 20% d-limonene by volume, at about ambient temperature without substantially changing the physical properties of the hydrocarbon elastomer and subsequently grinding the pieces of softened cured hydrocarbon elastomer into hydrocarbon crumb without the application of heat.

5. The process of claim 4 wherein the elastomer is submerged in the liquid for a period of less than 12 hours.

6. A process for reclaiming cured hydrocarbon elastomers from tires, comprising submerging pieces of a cured hydrocarbon elastomer in a liquid comprising an effective amount of a polar aprotic solvent selected from the group of sulfoxides and oxidizing agents and an essential oil at about ambient temperature, without substantially changing the physical properties of the hydrocarbon elastomer, and subsequently grinding the pieces of softened cured hydrocarbon elastomer into hydrocarbon crumb without the application of heat, further comprising soaking the rubber crumb in a bath comprising soap and water and removing floating rubber crumb from the top of the bath.

7. A process for reclaiming vulcanized rubber elastomers from tires, comprising submerging pieces of a vulcanized rubber elastomer in a mixture comprising an essential oil and an effective amount of a polar aprotic solvent selected from the group of sulfoxides and oxidizing agents and mixtures thereof, thereby softening the vulcanized rubber elastomer, and subsequently grinding the pieces of softened vulcanized rubber elastomer into rubber crumb, wherein the polar aprotic solvent comprises dimethylsulfoxide in a concentration by volume of between 15% to 45% of the mixture.

8. The process of claim 7 wherein the elastomer is submerged in the liquid for a period of less than 12 hours.

9. The process of claim 7 wherein the softening of the vulcanized rubber elastomer is effected at about ambient temperatures.

10. A process for reclaiming vulcanized rubber elastomers from tires, comprising submerging pieces of a vulcanized rubber elastomer in a mixture comprising an essential oil and an effective amount of a polar aprotic solvent selected from the group of sulfoxides and oxidizing agents and mixtures thereof, thereby softening the vulcanized rubber elastomer, and subsequently grinding the pieces of softened vulcanized rubber elastomer into rubber crumb, wherein the essential oil is selected from the group consisting of d-limonene, linalool, mycrene and combinations thereof in a concentration of at least about 20% of the mixtures.

11. The process of claim 10 wherein the elastomer is submerged in the liquid for a period of less than 12 hours.

12. The process of claim 10 wherein the softening of the vulcanized rubber elastomer is effected at about ambient temperatures.

13. The process of claim 10 wherein the polar aprotic solvent does not substantially change the physical properties of the rubber elastomer.

14. A process for reclaiming vulcanized rubber elastomers from tires, comprising submerging pieces of a vulcanized rubber elastomer in a mixture comprising an essential oil and an effective amount of a polar aprotic solvent selected from the group of sulfoxides and oxidizing agents and mixtures thereof, thereby softening the vulcanized rubber elastomer, and subsequently grinding the pieces of softened vulcanized rubber elastomer into rubber crumb, wherein the polar aprotic solvent is selected from the group consisting of furaldehyde, furaldehyde diethyl acetal, furaldehyde dimethyldrazone, furan, trans-3-furanacrylic acid, 2-furanacrylonitrile, 2-furanboronic acid, 2(5H)-furanone, (2-furanylmethiene)malononitrile, furazolidone, furfuryl acetate, furfuryl alcohol, furfurylamine, furfuryl benzoate, furfuryl disulfide, furfuryl glycidyl ether, (furfurylideneacetyl) glycine, furfuryl mercaptan, furfuryl methacrylate, furfuryl methyl disulfide, 1-furfurylpyrrole, furfuryl sulfide, furfuryl thioacetate, furil, furoic acid, furoic hydrazide, furolin, 2-furonitrile, furosemide, 2-furoyl chloride, N-(2-furoyl)glycine, furylacrylic acid, and 4-(2-furyl)-3-buten-2-one, and combinations thereof.

15. A process for reclaiming cured natural rubber elastomers, comprising submerging pieces of a cured natural rubber elastomer in a liquid consisting essentially of an effective amount of a polar aprotic solvent, without substantially changing the physical properties of the natural rubber elastomer, and subsequently grinding the pieces of softened cured natural rubber elastomer into natural rubber crumb, wherein said polar aprotic solvent is dimethylsulfoxide in a concentration of between 15% and 45% by volume.

16. The process of claim 15 wherein the elastomer is submerged in the liquid for a period of less than 12 hours.

17. The process of claim 15 wherein the softening of the vulcanized rubber elastomer is effected at about ambient temperatures.

* * * * *